United States Patent [19]
Matsuura et al.

[11] Patent Number: 5,241,484
[45] Date of Patent: Aug. 31, 1993

[54] TRACING CONTROL METHOD
[75] Inventors: Hitoshi Matsuura, Hachioji; Tetsuji Okamoto, Minamitsuru, both of Japan
[73] Assignee: Fanuc Ltd., Minamitsuru, Japan
[21] Appl. No.: 689,741
[22] PCT Filed: Sep. 21, 1990
[86] PCT No.: PCT/JP90/01225
  § 371 Date: May 22, 1991
  § 102(e) Date: May 22, 1991
[87] PCT Pub. No.: WO91/04832
  PCT Pub. Date: Apr. 18, 1991
[30] Foreign Application Priority Data
  Oct. 4, 1989 [JP] Japan .................................. 1-259823
[51] Int. Cl.$^5$ ............................................ G05B 19/407
[52] U.S. Cl. ............................... 364/474.03; 318/571; 318/578; 364/474.3; 364/474.33
[58] Field of Search .............. 364/474.03, 474.28, 364/474.3, 474.37, 474.29, 474.33; 318/571, 576, 577, 578; 409/80, 93, 98, 99, 114, 127

[56] References Cited
U.S. PATENT DOCUMENTS

| | | | |
|---|---|---|---|
| 4,266,172 | 5/1981 | Yamazaki | 364/474.03 |
| 4,357,664 | 11/1982 | Imazeki et al. | 364/474.03 |
| 4,394,608 | 7/1983 | Tryber et al. | 364/474.03 X |
| 4,646,225 | 2/1987 | Matsuura | 364/474.03 |

FOREIGN PATENT DOCUMENTS

| | | |
|---|---|---|
| 0014563 | 8/1980 | European Pat. Off. . |
| 2020852 | 4/1978 | United Kingdom . |
| 2088094 | 6/1982 | United Kingdom . |

Primary Examiner—Joseph Ruggiero
Attorney, Agent, or Firm—Staas & Halsey

[57] ABSTRACT

A tracing control system machines a workpiece through tracing by repeating a plurality of tracing passes in a tracing direction which is constant to a pick feed while detecting amounts of displacement of respective axes applied to a stylus. A first abrupt change region (P1c) on a model (1) surface is detected using the amounts of displacement of the respective axes obtained in the previous tracing pass, and a first position (X1c, Y1c) of the first abrupt change region in the X-Y plane is stored. Similarly, a second abrupt change region (P2c) is detected and a second position (X2c, Y2c) in the X-Y plane is stored. The tracing speed is lowered in the next tracing pass in the section within the range of each predetermined distance (l1, l2) in front of and behind an intersection (X3p, Y3p) with an extended line passing through the first position (X1c, Y1c) and the second position (X2c, Y2c). When an abrupt change region is continued, this assumed position matches the position of an actual abrupt change region more accurately than before, and a smaller deceleration section can be set and the overall tracing time shortened.

5 Claims, 7 Drawing Sheets

TRACING CONTROL METHOD

BACKGROUND OF THE INVENTION

1. Field of the Invention

The present invention relates to a tracing control method, and more particularly, to a tracing control method by which an overshot machining of a cutter into a workpiece at a region of a model where the shape thereof undergoes an abrupt change is prevented, whereby the overall tracing time can be shortened.

2. Description of the Related Art

In a tracing control, the amounts of displacement of respective axes applied to a stylus are detected by a tracer head, speed commands of the respective axes are calculated in a tracing calculating circuit by using these amounts of displacement, motors of the respective axes are driven in accordance therewith, and the tracer head is moved along the surface of a model while the cutter is moved relatively against a workpiece at the same speed, and by repeating this motion the workpiece is machined to the same shape as the model.

Nevertheless, such a tracing control has a problem in that an overshot machining might occur at regions of the model where the shape is abruptly changed if the tracing speed is too high.

To solve this problem, the applicants filed Japanese Patent Application No. 1-192383 wherein the title of the invention is "TRACING CONTROL METHOD", on Jul. 25, 1990. In this Patent Application No. 1-192383, a region in which an abrupt change of the model surface occurs is detected based on the amounts of displacement of the respective axes obtained by the tracer head, the position in the tracing direction is stored, and the tracing speed is lowered only in a section within the range of predetermined distances in front of and behind the position in the tracing direction stored this time, in the next tracing pass, to prevent an overshot machining and accordingly, to shorten the overall tracing time.

Nevertheless, because the position of an actual abrupt change region in the next tracing pass is not always at the same position as that of the abrupt change region detected in this tracing pass, the range of the deceleration section can not be set to a value small enough to cope with this anomaly, and thus the desired shortening of the tracing time cannot be attained.

SUMMARY OF THE INVENTION

The present invention has been made in view of the aforesaid drawbacks, and an object of the present invention is to provide a tracing control method in which an overshot machining of the cutter into a workpiece at a region of a model where the shape thereof undergoes an abrupt change is prevented, and thus the overall tracing time can be further shortened.

To achieve the above object, in accordance with the present invention there is provided a tracing control method for machining a workpiece through tracing by repeating a plurality of tracing passes in the tracing direction which is constant to a pick feed while detecting amounts of displacement of respective axes applied to a stylus, comprising detecting a first abrupt change region on the above model surface using the amounts of displacement of the respective axes obtained in the previous tracing pass, storing at least a first position in a specific plane on the above first abrupt change region, detecting a second abrupt change region contiguous to the above first abrupt change region on the above model surface using the amounts of displacement of the respective axes obtained in this tracing pass, storing a second position in the above specific plane on the above second abrupt change region, and lowering the tracing speed in the next tracing pass in a section within the range of predetermined distances in front of and behind an intersection of a position in the above specific plane with an extended line passing through the above first position and the above second position.

Assuming that a next abrupt change region exists on the extended line connecting the abrupt change region of the previous tracing pass to the abrupt change region of this tracing pass, the tracing speed is lowered only in the section in the vicinity of this assumed abrupt change region in the next tracing pass. If the abrupt change region is continued, this assumed position matches the position of an actual abrupt change region more accurately than before, and thus the deceleration section can be set to a smaller value.

DESCRIPTION OF THE PREFERRED EMBODIMENT

An embodiment of the present invention will hereinafter be described with reference to the drawings.

Figure 1:
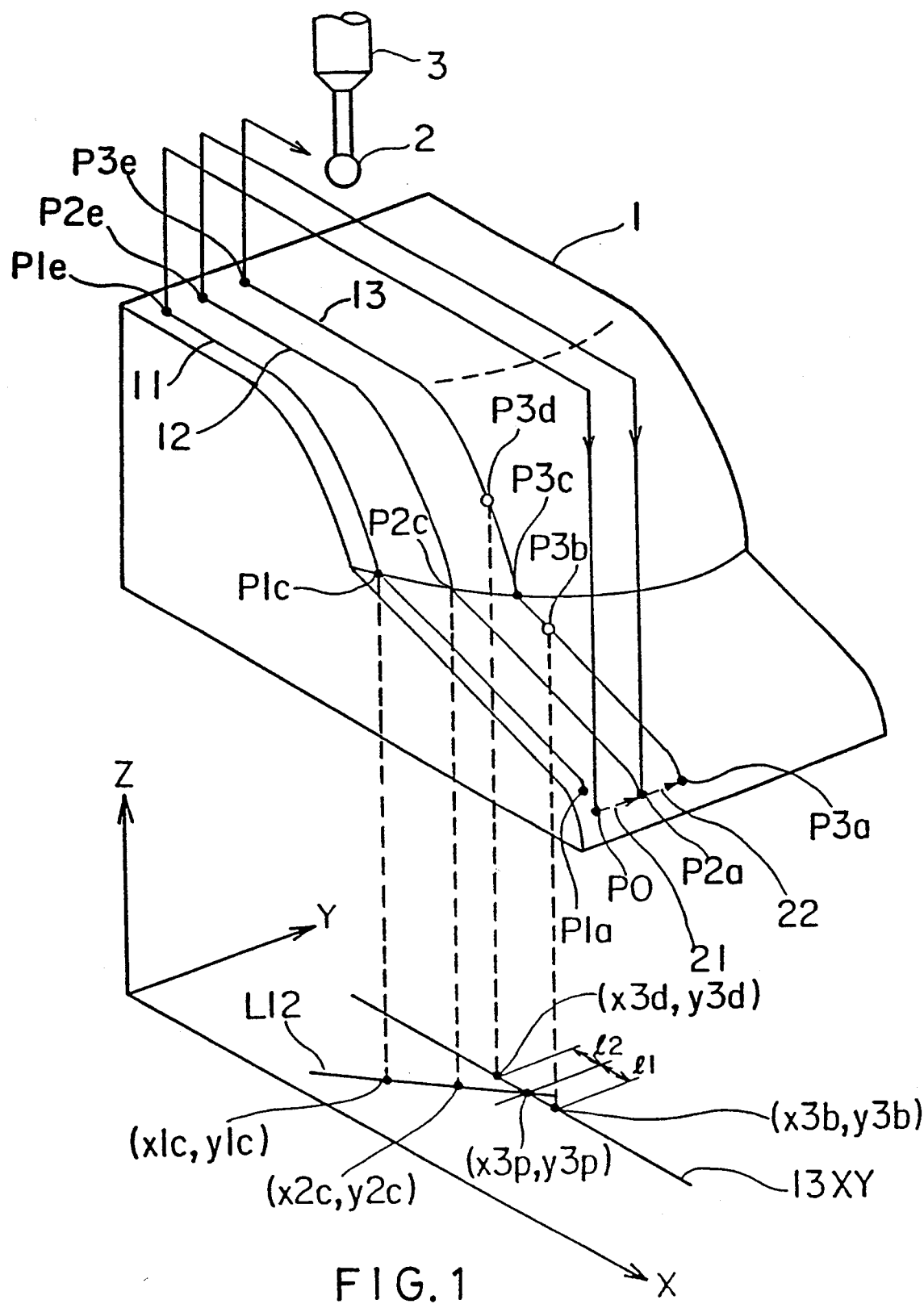
FIG. 1 and FIG. 2 are explanatory views of a tracing control method according the present invention.

FIG. 1 is an explanatory view of a tracing control method according to the present invention. In FIG. 1, a tracer head 3 is moved relatively in the X-axis direction against a model 1 while being moved vertically along the shape of the model 1 in the Z-axis direction, bringing a stylus 2 into contact with a surface of the model 1 from a starting point P1a, and a section of a pass 11 is traced at a relatively low tracing speed F1.

Here, changes in the contour of the model 1 are determined by a method, described later, using amounts of displacement of the respective axes detected by the tracer head 3 at predetermined sampling times during this tracing, and a point P1c of an abrupt change region is detected thereby. When the point P1c is detected, the coordinate values (x1c, y1c) on the X-Y plane thereof are stored.

When tracing to a point P1e is finished, the stylus 2 is removed from the model 1 and moved to a point P0 in the vicinity of the point P1a, further moved to a point P2a by carrying out a pick feed 21 in the Y-axis direction, and during tracing of a pass 12 carried out from this point at the speed F1, a point P2c of an abrupt change region is detected as before and the coordinate values (x2c, y2c) thereof on the X-Y plane are stored.

When the tracing to a point P2c is completed, the stylus 2 is removed from the model 1 and returned to the point P2a, and then moved to a point P3a by carrying out a pick feed 22 in the Y-axis direction, and the tracing of a pass 13 is started from this point at a desirable quick tracing speed Ff. When the position on the pass 13xy on the X-Y plane reaches a point P3b of coordinate values (x3b, y3b) by a distance l1 in front of intersection coordinates (x3p, y3p) at which an extended line L12 passes through the coordinate values (x1c, y1c) and (x2c, y2c), the tracing speed is immediately lowered to Fs, and an abrupt change region P3c is passed at this speed. Then, after reaching a point P3d of coordinate values (x3d, y3d) ahead of the intersection coordinates (x3p, y3p) by a distance l2, the tracing speed is raised to Ff and tracing is continued to a point P3e.

Note, the contour change is also determined by using the amounts of displacement from the tracer head 3 in this pass 13, whereby the point P3c of the actual abrupt change region in the pass 13 is detected and the coordinate values thereof on the X-Y plane are stored. Thereafter, tracing is started at the tracing speed Ff in the next pass, and when the position in the X-Y plane enters the range within the distances l1 and l2 respectively in front of and behind the intersection at which an extended line passes through coordinate values (x2c, y2c) and coordinate values of an abrupt change region newly stored during the pass 13, the tracing speed is lowered to Fs and increased again when the tracing moves outside of this range.

As mentioned above, the tracing is carried out by detecting regions at which the shape of the model undergoes an abrupt change, whereby the tracing speed is lowered only in a section in front of and behind an intersection of the position on the X-Y plane at which an extended line passes through each of the coordinate values of abrupt change regions detected in the previous pass and the pass before the previous pass, and thus the tracing can be carried out at desired high speed in other sections.

Where a plurality of abrupt change regions exist in the course of a single pass, it is necessary to specify from which abrupt change region in the previous pass does the abrupt change region detected in this pass continue.

Figure 2:
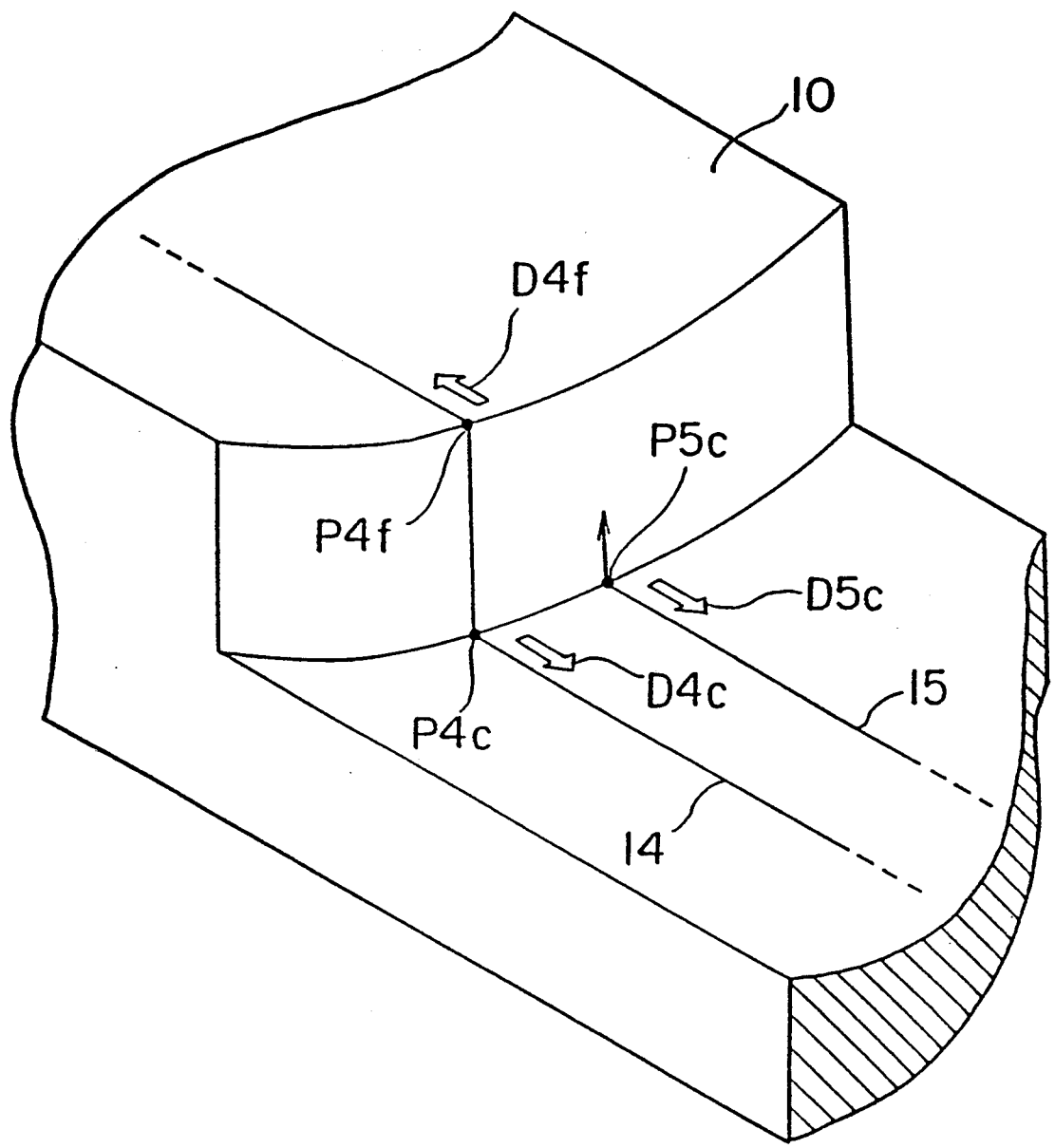

Such a case is shown in FIG. 2. When tracing a model 10 in this Figure, X and Y coordinate values of abrupt change regions P4c and P4f detected in a previous pass 14, and displacement directions of the stylus D4c and D4f in each abrupt change region, are stored, the displacement directions of the stylus D4c and D4f are compared with a displacement direction of the stylus D5c at a point of an abrupt change region P5c when detected in this pass 15, and the abrupt change region P4c in almost the same direction is determined to be an abrupt change region contiguous to the abrupt change region P5c.

Next, a method of detecting an abrupt change region will be explained with reference to FIG. 3. In this Figure, vectors Ex, Ey and Ez are vectors in the direction the X-, Y- and Z-axes respectively and having a size corresponding to the amounts of displacement of the respective axes $\epsilon x$, $\epsilon y$ and $\epsilon z$ detected by the tracer head 3, and E is a synthetic vector thereof. That is:

$$|E| = (\epsilon x^2 + \epsilon y^2 + \epsilon z^2)^{\frac{1}{2}}.$$

The angle $\theta$ made by the vector E in the X-Y plane and the angle $\phi$ made by the vector E with the Z-axis are calculated by the following equations:

$$\theta = \tan^{-1}(\epsilon y / \epsilon x) \tag{1}$$

$$\phi = \cos^{-1}(\epsilon z / \epsilon) \tag{2}.$$

Figure 3:
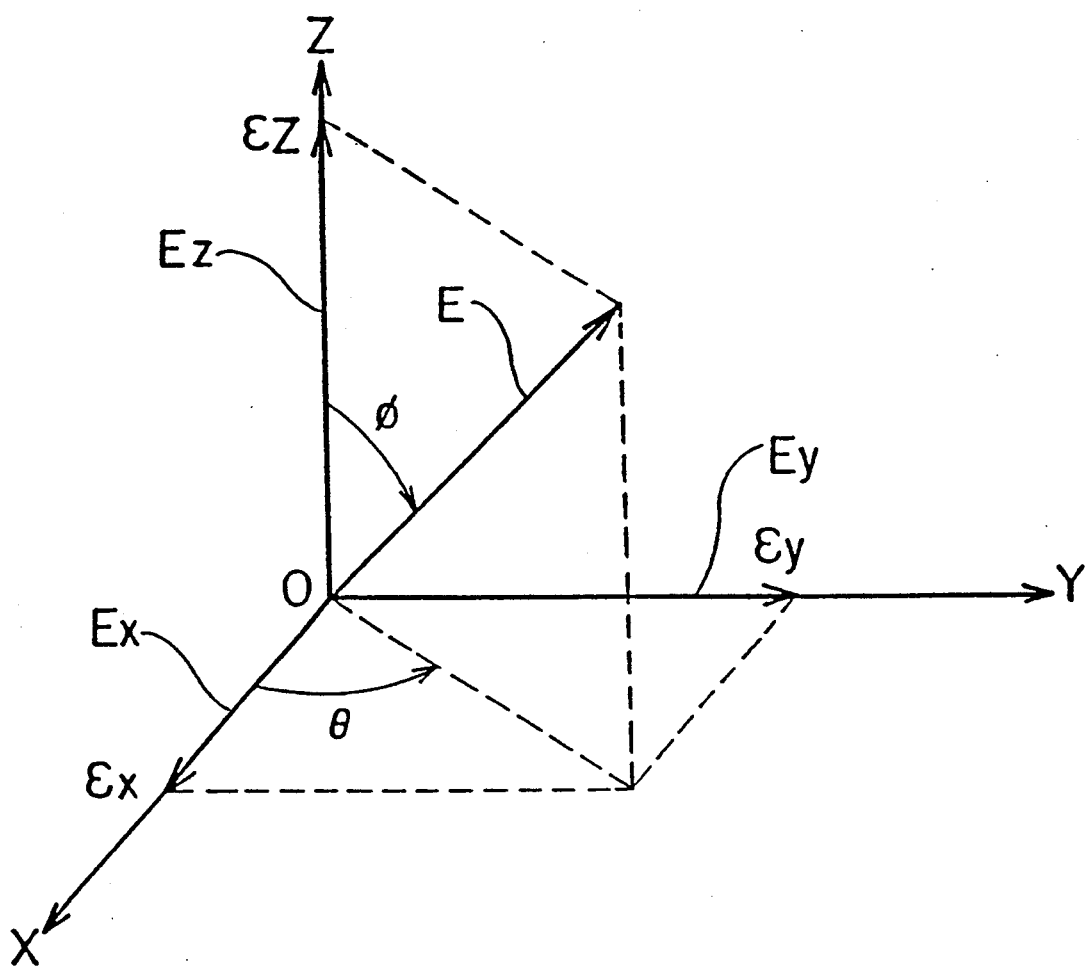
FIG. 3 is an explanatory view of a detection method of an abrupt change region according to the present invention.

Here, $\epsilon$ is the size of the vector E, i.e., a synthetic amount of displacement, and thus the angles $\theta$ and $\phi$ are independent of each other in the three-dimensional coordinate system in FIG. 3, and a contour change of a three-dimensional model can be easily recognized by monitoring these changes.

At this stage, the values of the angles $\theta$ and $\phi$ at the previous sampling are stored, the differences therebetween and each of the values obtained at this sampling are calculated, and an abrupt change region is determined when a total value of these differences exceed a preset value.

Also, the above mentioned displacement direction of the stylus corresponds to the direction of the vector E, and whether or not this is a contiguous abrupt change region is determined therefrom.

Figure 4:
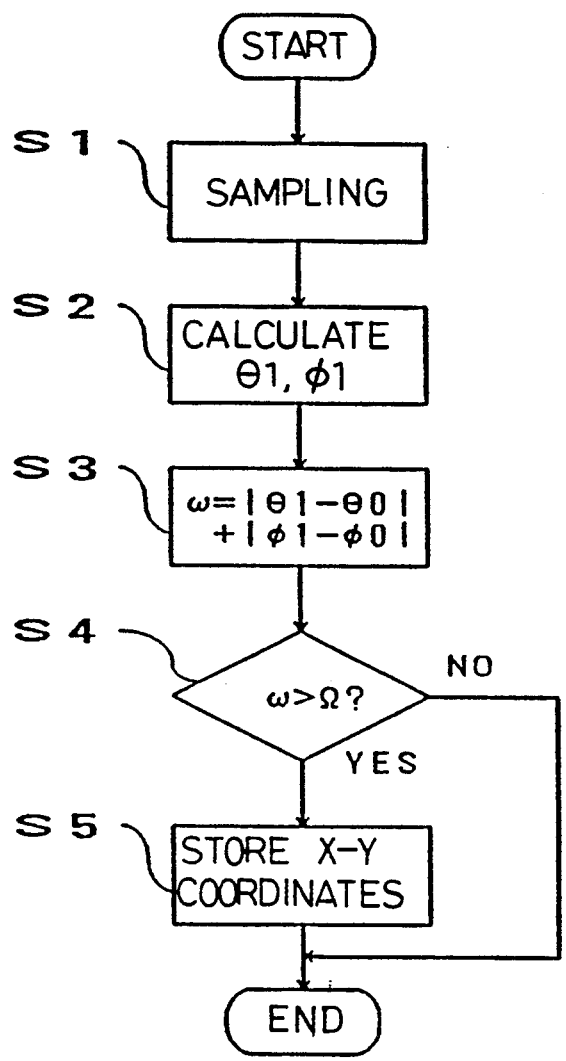
FIG. 4 is a flow chart of detection processing of an abrupt change region in an embodiment according to the present invention.

FIG. 4 is a flow chart of a detection processing of an abrupt change region in an embodiment according to the present invention. In this Figure, numerical values following the letter S show the number of the step.

[S1] The amounts of displacement $\epsilon x$, $\epsilon y$ and $\epsilon z$ detected by the tracer head are sampled at predetermined sampling times.

[S2] The angles $\theta 1$ and $\phi 1$ at this sampling are calculated by the above equations (1) and (2).

[S3] The difference between the angle $\theta 1$ at this sampling and the angle $\theta 0$ at the previous sampling and the difference between the angle $\phi 1$ at this sampling and the angle $\phi 0$ at the previous sampling are calculated, and the total value $\omega$ is obtained.

[S4] It is determined whether or not the total value $\omega$ is larger than a set value $\Omega$. If it is larger, the process goes to S5, and if it is not larger, the process is finished.

[S5] An abrupt change region is determined, and the X and Y coordinates at the present position are stored.

Figure 5A:
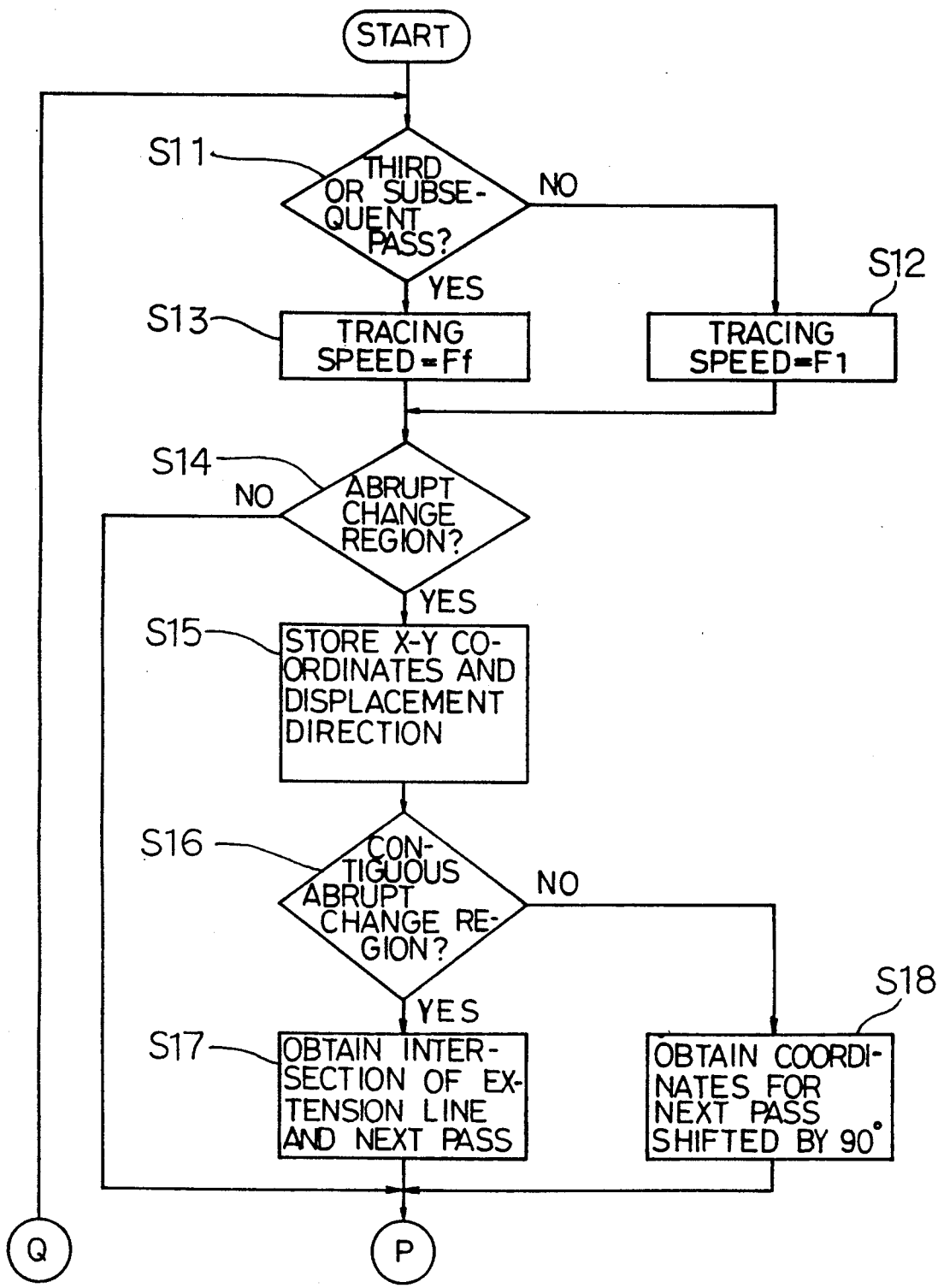
FIGS. 5(a) and 5(b) are flow charts of a tracing control method of an embodiment according to the present invention.
Figure 5B:
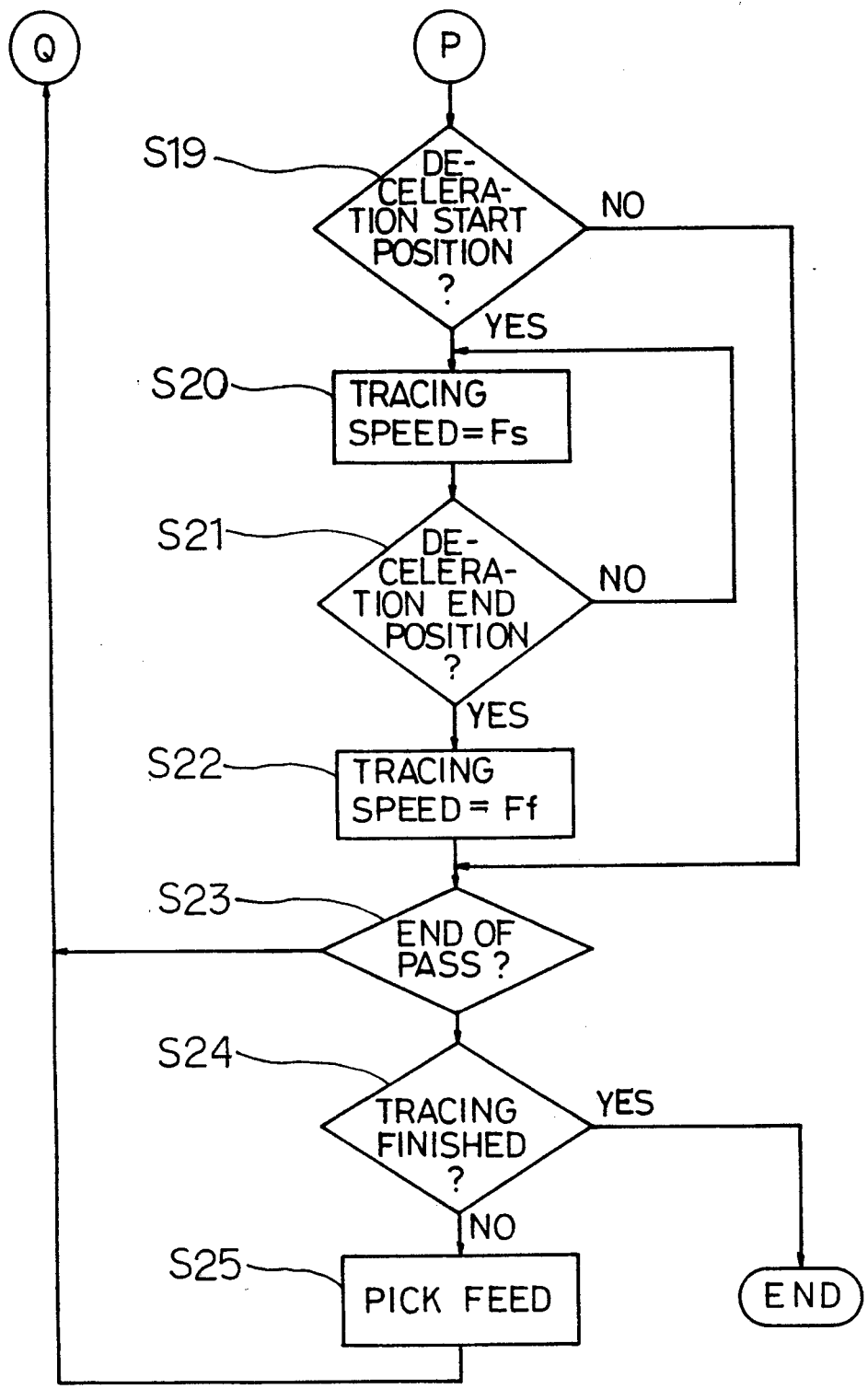

FIGS. 5(a) and 5(b) are flow charts of a tracing control method of an embodiment according to the present invention.

[S11] If this is a tracing pass for a first or a second time, the process goes to S12, but if this is a tracing pass made after a third time, the process goes to S13.

[S12] Tracing is started at a tracing speed F1.

[S13] Tracing is started at a desired high tracing speed Ff.

[S14] It is determined whether or not an abrupt change region exists, according to the flow chart in FIG. 4. If an abrupt change region exists, the process goes to S15, and if it does not, the process goes to S19.

[S15] The X and Y coordinates at the present position and displacement direction of the stylus are stored.

[S16] It is determined whether or not this abrupt change region is contiguous to the abrupt change region of the previous pass, i.e., it is determined whether or not the displacement direction of the stylus matches the displacement direction in the abrupt change region of the previous pass. If there is a match, the abrupt change region is considered to be contiguous to that of the previous pass, and the process goes to S17. If there is no match, the abrupt change region is considered not to be contiguous to the previous pass (including the first and the second passes), and thus the process goes to S18.

[S17] In the X-Y plane, coordinate values of an intersection of the next pass with an extended line passing through the abrupt change region of the previous pass and the abrupt change region of this pass contiguous therefrom are obtained, and accordingly, the position in front of this position by the distance l1 is set as a deceleration start position and the position following this position by the distance l2 is set as a deceleration end position.

[S18] Coordinate values on the next pass transversely shifted against the present position by 90°, i.e., in the Y-axis direction, are obtained, and the position in front of this position by the distance l1 is set as a deceleration start position and the position following this position by the distance l2 is set as a deceleration end position.

[S19] If the tracing head is at the deceleration start position, the process goes to S20, and if not, the process goes to S23.

[S20] The tracing speed is lowered to Fs.

[S21] If the tracing head is at the deceleration end position, the process goes to S20, and if not, tracing is continued at the tracing speed Fs.

[S22] The tracing speed is increased to Ff.

[S23] If the tracing head is at the end of the pass, the process goes to S24, and if the tracing head is not at the end of the pass, the process returns to S11 to continue the tracing of this pass.

[S24] If the tracing is not finished, the process goes to S25.

[S25] A pick feed is carried out and a tracing of the next pass is started.

Figure 6:
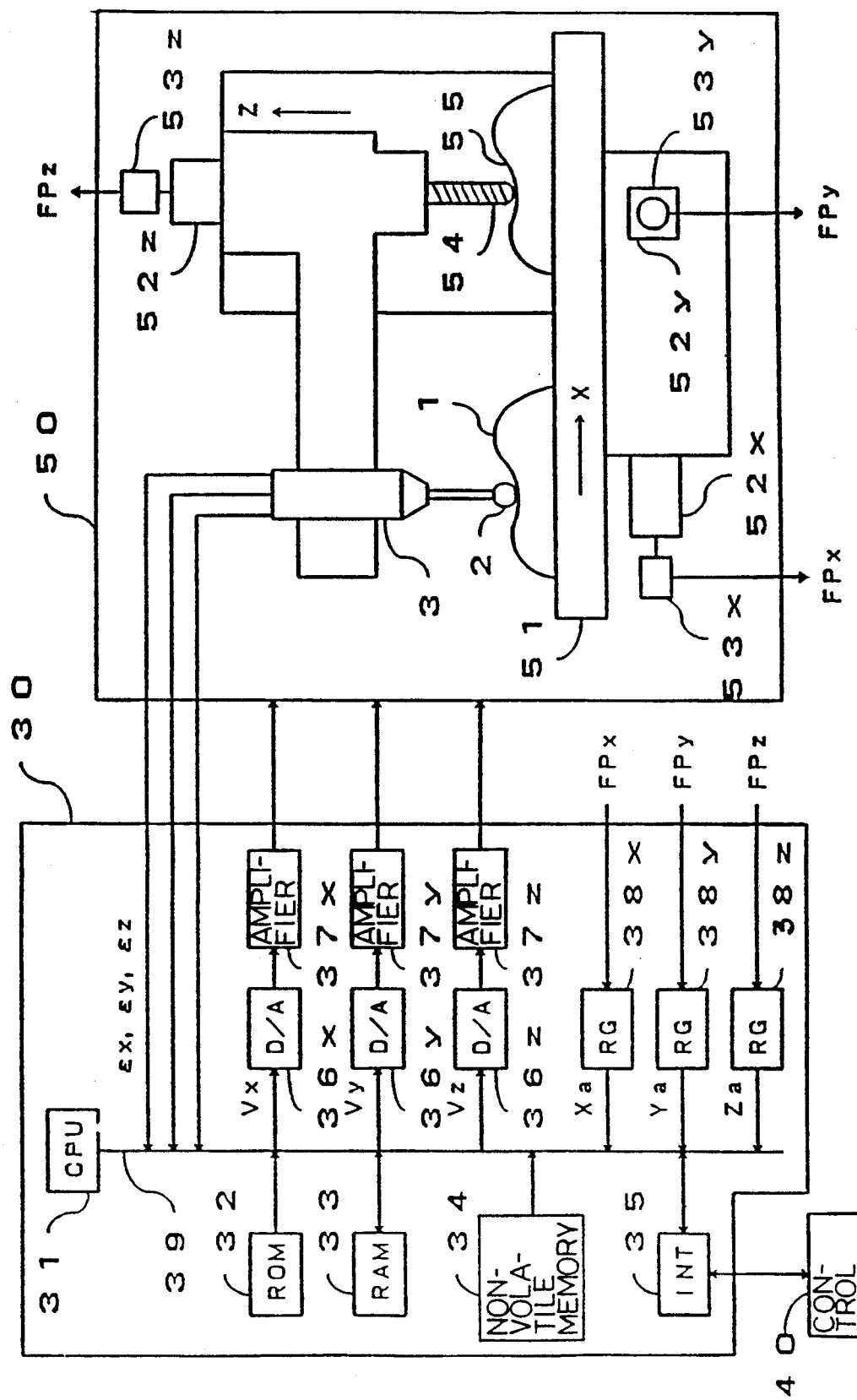
FIG. 6 is a block diagram showing constitution of a tracing control system to carry out the present invention.

FIG. 6 is a block diagram showing the constitution of a tracing control system according to the present invention. In FIG. 6, a processor 31 reads a system program stored in a ROM 32 through a bus 39, and controls the overall operation of a tracing control system 30 according to the system program. A RAM 33 stores the amounts of displacement of the respective axes detected by the tracer head 3 and other temporary data. A nonvolatile memory 34 is powered by a battery (not shown) and stores various parameters such as tracing direction and tracing speed, etc. input from a control panel 40 through an interface 35.

The tracer head 3 provided in a tracing machine 50 detects the amounts of displacement εx, εy and εz in the X, Y and Z directions generated by bringing the tip end of the stylus 2 into contact with the model 1, and inputs these amounts to the processor 31.

The processor 31 generates a speed command Vx for the X-axis, a speed command Vy for the Y-axis and a speed command Vz in the Z-axis based on the amounts of displacement εx, εy and εz and a commanded tracing direction and tracing speed according to the known process. These speed commands are analog converted by D/A converters 36x, 36y and 36z, input to servo amplifiers 37x, 37y and 37z and output thereby, and servomotors 52x, 52y and 52z of the tracing control machine 50 are driven in accordance therewith.

Accordingly, the tracer head 3 is moved in the Z-axis direction so that the relative position between the tracer head 3 and the model 1 is kept constant, and at the same time, a table 51 is moved in the Z-axis direction and the Y-axis direction at right angles to the paper surface to thereby machine a workpiece 55 to the same shape as the model 1 by a cutter 54, which is Z-axis controlled in the same way as the tracer head 3.

Also, pulse coders 53x, 53y and 53z are provided in these servo motors 52x, 52y and 52z and generate detection pulses FPx, FPy and FPz at predetermined rotations of the servomotors. Present position registers 38x, 38y and 38z in the tracing control system 30 obtain present position data Xa, Ya and Za of the tracer head 3 by counting up/down the detection pulses FPx, FPy and FPz according to the respective rotation direction, and the position data is read by the processor 31 to thereby enable a control operation such as an approach and pick feed of the tracer head 3.

Note, the tracing direction in the above explanation is not limited to the X-axis but can be set for other axes or to a direction at a certain angle to these axes. Also, the present invention is not limited to tracing of a one-way surface but can be applied to other tracing processes of repeating a plurality of passes in the tracing direction with a constant pick feed, such as reciprocal surface tracing and contour tracing.

According to the present invention, as described above, because the position of an abrupt change region in the next tracing pass is assumed by using displacement amounts from the tracing head during tracing, and the tracing speed is lowered in front of the assumed abrupt change region by only a predetermined distance in the next tracing pass, tracing at a desired high tracing speed in regions other than this section will not cause the cutter to overshoot a workpiece. Further, since this abrupt change region is determined, for example, in a plane at right angles to the tracing plane, to be an intersection of an extended line connecting the abrupt change region of the previous pass to the abrupt change region of this pass, an error in the actual abrupt change region is small, and thus a smaller deceleration section can be set and the overall tracing time shortened.

Also, as it is determined whether or not the abrupt change region is contiguous by storing the displacement direction of the stylus in the abrupt change region in the previous pass, and by comparing this direction with the displacement direction of the stylus in the abrupt change region in this pass, the present invention can be applied to a model having a plurality of abrupt change regions existing in the course of a single pass, whereby the applicability of the present invention is widened.

What is claimed is:

1. A tracing control method for machining a workpiece through tracing a model surface by repeating a plurality of tracing passes in a tracing direction at a tracing speed with shifting by a pick feed between each pass, while detecting amounts of displacement of a stylus along respective axes, comprising the steps of:

(a) detecting a first abrupt change region on said model surface using the amounts of displacement of said stylus along the respective axes obtained in a first tracing pass and storing at least a first position in a specific plane corresponding to said first abrupt change region;

(b) detecting a second abrupt change region contiguous with said first abrupt change region on said model surface using the amounts of displacement of said stylus along the respective axes obtained in a second tracing pass and storing a second position in said specific plane corresponding to said second abrupt change region; and (c) lowering the tracing speed in a third tracing pass in a section within a range of predetermined distances in front of and behind a point on said model surface in the third tracing pass and corresponding to a position in said specific plane on an extended line passing through said first position and said second position.

2. A tracing control method according to claim 1,
wherein said detecting in step (a) further includes storing with said first position a displacement direction of said stylus in said first abrupt change region,
wherein said detecting in step (b) detects the second abrupt change region contiguous with said first abrupt change region when the displacement direction of said stylus in a predetermined abrupt change region detected in the second tracing pass matches the displacement direction stored with said first position, within a predetermined tolerance.

3. A tracing control method according to claim 1, wherein said specific plane is a plane at a right angle to a tracing plane.

4. A tracing control method according to claim 1, wherein the amounts of displacement of said stylus along the respective axes are sampled at predetermined sampling times,
wherein said detecting in steps (a) and (b) comprises the substeps of:

(1) obtaining a plurality of vectors corresponding to the amounts of displacement of said stylus along the respective axes;
(2) calculating an angle between said plurality of vectors;
(3) calculating a difference between the angle calculated in substep (2) during consecutive passes; and
(4) detecting one of said first and second abrupt change regions based on said difference calculated in substep (3).

5. A tracing control method according to claim 4,
wherein said calculating in substep (2) produces a plurality of angles which are independent of each other between said plurality of vectors,
wherein said calculating in substep (3) includes calculating differences between said plurality of angles at each sampling and obtaining a sum thereof, and
wherein said detecting the one of said first and second abrupt change regions when the sum of said differences exceeds a set value.

* * * * *